(12) United States Patent
Suzuki et al.

(10) Patent No.: US 7,897,712 B2
(45) Date of Patent: Mar. 1, 2011

(54) ORGANIC-INORGANIC HYBRID COMPOSITION, METHOD FOR PRODUCING THE SAME, MOLDING AND OPTICAL COMPONENT

(75) Inventors: Ryo Suzuki, Kanagawa (JP); Tatsuhiko Obayashi, Kanagawa (JP); Hiroaki Mochizuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 97 days.

(21) Appl. No.: 12/278,165

(22) PCT Filed: Feb. 9, 2007

(86) PCT No.: PCT/JP2007/052790
§ 371 (c)(1),
(2), (4) Date: Aug. 4, 2008

(87) PCT Pub. No.: WO2007/091730
PCT Pub. Date: Aug. 16, 2007

(65) Prior Publication Data
US 2009/0017280 A1    Jan. 15, 2009

(30) Foreign Application Priority Data
Feb. 10, 2006   (JP) ............................. 2006-033759

(51) Int. Cl.
*C08G 77/00* (2006.01)
(52) U.S. Cl. ........................................ 528/10; 977/827
(58) Field of Classification Search ................ 528/10
See application file for complete search history.

(56) References Cited

U.S. PATENT DOCUMENTS

| 5,143,988 A | 9/1992 | Wang et al. |
| 2002/0128502 A1 | 9/2002 | Su et al. |
| 2009/0035548 A1* | 2/2009 | Aiki et al. ................... 428/220 |

FOREIGN PATENT DOCUMENTS

| JP | 08-060022 A | | 3/1996 |
| JP | 2000-327836 A | | 11/2000 |
| JP | 2001-031877 A | | 2/2001 |
| JP | 2001-164117 A | | 6/2001 |
| JP | 2003-055517 A | | 2/2003 |
| JP | 2003055517 A | * | 2/2003 |
| JP | 2003073559 A | * | 3/2003 |
| JP | 2006-219646 A | | 8/2006 |
| WO | 91/08241 A1 | | 6/1991 |
| WO | 03/013846 A1 | | 2/2003 |
| WO | WO 03013846 A1 | * | 2/2003 |
| WO | 2005/010100 A | | 2/2005 |

OTHER PUBLICATIONS

Extended European Search Report for EPA No. 077143204.4 dated Oct. 15, 2009, English.

* cited by examiner

*Primary Examiner*—Randy Gulakowski
*Assistant Examiner*—Lindsay Nelson
(74) *Attorney, Agent, or Firm*—Sughrue Mion, PLLC

(57) ABSTRACT

An organic-inorganic hybrid composition comprising inorganic fine particles having a refractive index of from 1.90 to 3.00, and a thermoplastic resin having a functional group capable of forming a chemical bond with the inorganic fine particles at one or more polymer chain terminals and having a number average molecular weight of from 1,000 to 500,000. The composition has high refraction properties and excellent transparency.

16 Claims, No Drawings

ORGANIC-INORGANIC HYBRID COMPOSITION, METHOD FOR PRODUCING THE SAME, MOLDING AND OPTICAL COMPONENT

TECHNICAL FIELD

The present invention relates to an organic-inorganic hybrid composition having excellent high refraction properties, transparency, lightweight properties and workability, and an optical component such as a lens substrate that is constructed to include the organic-inorganic hybrid composition (e.g., lenses to constitute eyeglasses, lenses for optical instruments, lenses for optoelectronics, lenses for lasers, lenses for pickups, lenses for in-vehicle cameras, lenses for portable cameras, lenses for digital cameras, lenses for OHP and microlens arrays).

BACKGROUND ART

Optical materials are much studied these days, and especially in the field of lenses, it is strongly desired to develop materials having high refraction properties, heat resistance, transparency, easy moldability, lightweight properties, chemical resistance and solvent resistance.

As compared with inorganic materials such as glass, plastic lenses are lightweight and are hardly cracked, and they can be worked into various shapes. Accordingly, these days, they are being much popularized not only for eyeglass lenses but also for other various optical materials such as lenses for portable cameras and pickup lenses.

With that, the plastic material itself for lenses is desired to have high refractive index for obtaining thin lenses and downsized pickup devices. For example, a technique of introducing a sulfur atom into a polymer (see JP-A-2002-131502 and JP-A-10-298287), and a technique of introducing a halogen atom and an aromatic ring into a polymer (see JP-A-2004-244444) are being much studied. However, a plastic material having high refractive index and having good transparency so as to be substitute for glass is not as yet developed. Further, in optical fibers and optical waveguides, materials having different refractive indexes are used in combination, or a material having distributed refractive index is used. Thus, to provide a material having different refractive index by sites, development of a technique that can optionally control a refractive index is desired.

From that it is difficult to increase a refractive index with only an organic material, a technique of increasing a refractive index of a resin by dispersing an inorganic material having high refractive index in a resin matrix is reported (see JP-A-2003-73559). To reduce transmitted light attenuation due to Rayleigh scattering, it is preferable to uniformly disperse inorganic fine particles having a particle size of 15 nm or less in a resin matrix. However, primary particles having a particle size of 15 nm or less are very liable to agglomerate, and therefore, it is extremely difficult to uniformly disperse those in a rein matrix. Further, considering transmitted light attenuation in optical path length corresponding to a thickness of a lens, the amount of inorganic fine particles added must be limited. For this reason, it has not hitherto been realized to disperse fine particles in a resin matrix in high concentration without deteriorating transparency of a resin.

A resin composition molding which is a molding mainly comprising a thermoplastic resin composition having dispersed therein ultrafine particles having a number average particle size of from 0.5 to 50 nm and has a birefringence per 1 mm optical path length of 10 nm or less on the average (see JP-A-2003-147090), or a thermoplastic material resin composition comprising a thermoplastic resin having a refractive index shown by a specific equation and Abbe number and inorganic fine particle having specific average particle diameter and refractive index, and an optical component using the composition are reported (see JP-A-2003-73563 and JP-A-2003-73564). Those are that inorganic fine particles are dispersed in a resin, but any of those did not exhibit sufficient performances from the standpoint that fine particles are dispersed in a resin matrix in high concentration without deteriorating transparency of a resin.

On the other hand, for an organic-inorganic hybrid composition, a method of melt kneading surface organic-modified inorganic particles and an acidic group-containing resin is reported, but the amount of the inorganic particles added is about 1% by mass, and it is not said to be sufficient (see JP-A-2004-217714). Further, an organic-inorganic hybrid composition in which a surface-modifying group of inorganic particles and a resin are bonded through a linker is reported (see JP-T-2004-352975 (the term "JP-T" as used herein means a published Japanese translation of a PCT patent application)). However, operation is complicated such that high temperature is required for bond formation, and there is the possibility of gelation. Thus, the composition did not exhibit sufficient performance from the standpoint of processability. Further, there is no any disclosure in any of those Patent Documents regarding a thick transparent article that can be used in lenses having high refractive index.

DISCLOSURE OF THE INVENTION

A material composition that satisfies all of the requirements of high refraction properties, transparency and lightweight properties and further can optionally control a refractive index, and an optical component constructed to include the same are not yet found, and its development is desired.

The present invention has been made in view of the above actual situation, and its object is to provide an organic-inorganic hybrid composition having fine particles dispersed in a resin matrix, and having excellent transparency and high refractive index, and an optical component such as a lens substrate, using the same.

As a result of keen investigations to achieve the above object, the present inventors have found that an organic-inorganic hybrid composition using inorganic fine particles having a specific refractive index and a specific resin as raw materials has high refraction properties and excellent transparency by uniform dispersion effect of the fine particles, and have reached to complete the present invention described hereinafter.

[1] An organic-inorganic hybrid composition comprising inorganic fine particles having a refractive index of from 1.90 to 3.00, and a thermoplastic resin having a functional group capable of forming a chemical bond with the inorganic fine particles at one or more polymer chain terminals and having a number average molecular weight of from 1,000 to 500,000.

[2] The organic-inorganic hybrid composition of [1], wherein the functional group capable of forming a chemical bond with the inorganic fine particles is a functional group selected from the group consisting of

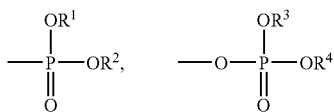

—SO₃H, —OSO₃H, —CO₂H and —Si(OR⁵)$_m$R⁶$_{3-m}$, wherein R¹, R², R³, R⁴, R⁵ and R⁶ each independently represent a hydrogen atom, a substituted or unsubstituted alkyl group, a substituted or unsubstituted alkenyl group, a substituted or unsubstituted alkynyl group or a substituted or unsubstituted phenyl group, and m is an integer of from 1 to 3, or its salt.

[3] The organic-inorganic hybrid composition of [1] or [2], wherein the thermoplastic resin has a refractive index larger than 1.55.

[4] The organic-inorganic hybrid composition of any one of [1] to [3], wherein the inorganic fine particles have a number average particle size of from 1 to 15 nm.

[5] The organic-inorganic hybrid composition of any one of [1] to [4], wherein at least one of titanium oxide and zirconium oxide is contained as the inorganic fine particles.

[6] The organic-inorganic hybrid composition of any one of [1] to [5], having a light transmittance of 80% or more at a wavelength of 589 nm in terms of the composition having a thickness of 1 mm.

[7] The organic-inorganic hybrid composition of any one of [1] to [6], which is thermoplastic.

[8] The organic-inorganic hybrid composition of any one of [1] to [7], which is a solvent-free solid.

[9] A method for producing an organic-inorganic hybrid composition, comprising mixing inorganic fine particles having a refractive index of from 1.90 to 3.00, and a thermoplastic resin having a functional group capable of forming a chemical bond with the inorganic fine particles at one or more polymer chain terminals and having a number average molecular weight of from 1,000 to 500,000 in an organic solvent.

[10] The method for producing an organic-inorganic hybrid composition of [9], comprising surface-treating inorganic fine particles having a refractive index of from 1.90 to 3.00 in water, an alcohol or a mixture of water and an alcohol in the presence of a surface-treating agent; extracting the surface-treated inorganic fine particles in an organic solvent, and mixing the extracted inorganic fine particles with a thermoplastic resin having a functional group capable of forming a chemical bond with the extracted inorganic fine particles at one or more polymer chain terminals and having a number average molecular weight of from 1,000 to 500,000.

[11] The method for producing an organic-inorganic hybrid composition of [9] or [10], comprising mixing an organic solvent dispersion of inorganic fine particles having a refractive index of from 1.90 to 3.00 with a thermoplastic resin having a functional group capable of forming a chemical bond with the inorganic fine particles at one or more polymer chain terminals and having a number average molecular weight of from 1,000 to 500,000, and distilling away a solvent from the resulting mixed liquid.

[12] The method for producing an organic-inorganic hybrid composition of [9] or [10], comprising mixing an organic solvent dispersion of inorganic fine particles having a refractive index of from 1.90 to 3.00 with a thermoplastic resin having a functional group capable of forming a chemical bond with the inorganic fine particles at one or more polymer chain terminals and having a number average molecular weight of from 1,000 to 500,000, and reprecipitating the resulting mixed liquid.

[13] An organic-inorganic hybrid composition produced by the production method of any one of [9] to [12].

[14] A molding comprising the organic-inorganic hybrid composition of any one of [1] to [8] and [13], the molding having a maximum thickness of 0.1 mm or more.

[15] The molding of [14], having a light transmittance of 70% or more at a wavelength of 589 nm in terms of the molding having a thickness of 1 mm, and a refractive index of 1.63 or more.

[16] An optical component comprising the molding of [14] or [15].

[17] The optical component of [16], which is a lens substrate.

According to the invention, an organic-inorganic hybrid composition having excellent transparency and high refractive index in combination, and an optical component using the same can be provided. Further, according to the invention, an optical component having good mechanical strength and heat resistance is easily provided.

BEST MODE FOR CARRYING OUT THE INVENTION

The organic-inorganic hybrid composition and an optical component such as a lens substrate constructed to include the same, of the invention are described in detail below. The description of the constitutive elements described hereinafter is based on the representative embodiment of the invention, and the invention should not be limited to such an embodiment. In the description, the numerical range expressed by the wording "from a number to another number" means the range that falls between the former number indicating the lower limit of the range and the latter number indicating the upper limit thereof.

[Organic-Inorganic Hybrid Composition]

The organic-inorganic hybrid composition of the invention comprises inorganic fine particles having a refractive index of from 1.90 to 3.00, and a thermoplastic resin having a functional group capable of forming a chemical bond with the inorganic fine particles at one or more polymer chain terminals and having a number average molecular weight of from 1,000 to 500,000. In the organic-inorganic hybrid composition of the invention, the inorganic fine particles are dispersed in the thermoplastic resin.

The organic-inorganic hybrid composition of the invention is preferable solid. Solvent content is preferably 25% by mass or less, more preferably 20% by mass or less, and further preferably 10% by mass or less, and it is most preferable to be solvent-free.

The organic-inorganic hybrid composition of the invention has a refractive index of preferably 1.60 or more, more preferably 1.63 or more, further preferably 1.65 or more, and particularly preferably 1.67 or more, at a wavelength of 589 nm.

The organic-inorganic hybrid composition of the invention has a light transmittance of preferably 70% or more, more preferably 75% or more, and particularly preferably 80% or more, at a wavelength of 589 nm in terms of the composition having a thickness of 1 mm. Further, the light transmittance at a wavelength of 405 nm in terms of the composition having a thickness of 1 mm is preferably 60% or more, more preferably 65% or more, and particularly preferably 70% or more.

When the light transmittance at a wavelength of 589 nm in terms of the composition having a thickness of 1 mm is 70% or more, a lens substrate having further preferable properties is liable to obtain. The light transmittance in terms of 1 mm thickness conversion in the invention is a value measured as follows. An organic-inorganic hybrid composition is molded to prepare a substrate having a thickness of 1.0 mm, and a light transmittance of the substrate is measured with a UV-visible ray spectrometric device (UV-3100, a product of Shimadzu Corporation).

The organic-inorganic hybrid composition of the invention has a glass transition temperature of preferably from 100 to 400° C., and more preferably from 130 to 380° C. When the glass transition temperature is 100° C. or higher, there is the tendency that sufficient heat resistance is liable to be obtained, and when the glass transition temperature is 400° C. or lower, there is the tendency that it is liable to conduct processing.

The thermoplastic resin and inorganic fine particles that are the essential constitutive components of the organic-inorganic hybrid composition of the invention are successively described below. The organic-inorganic hybrid composition of the invention may contain additives such as resins that do not satisfy the requirements of the invention, dispersants, plasticizers and release agents, other than those essential constitutive components.

[Thermoplastic Resin]

The organic-inorganic hybrid composition of the invention contains a thermoplastic resin having a functional group capable of forming a chemical bond with the inorganic fine particles at one or more polymer chain terminals and having a number average molecular weight of from 1,000 to 500,000.

Even though inorganic fine particles having a particle size sufficiently smaller than a wavelength of light are merely contained in a composition in a large amount, it is unable to prevent agglomeration of inorganic fine particles, and as a result, transmitted light attenuates by Rayleigh scattering. For the necessity to avoid large attenuation of transmitted light, the inorganic component in an organic-inorganic hybrid composition could not be increased in the conventional method. However, the invention uses not only inorganic fine particles having a small particle size, but a thermoplastic resin having a specific functional group or its salt at a polymer chain terminal and having a number average molecular weight of from 1,000 to 500,000 as a matrix, and as a result, uniform dispersion of the inorganic fine particle in a matrix is realized, and an organic-inorganic hybrid composition having a refractive index exceeding 1.70 by suppressing scattering at the interface between the inorganic fine particles and the thermoplastic resin, and an optical component constructed to include the same can be obtained.

A basic skeleton of the thermoplastic resin used in the invention is not particularly limited, and conventional resin skeletons such as poly(meth)acrylic acid ester, polystyrene, polyvinyl carbazole, polyacrylate, polycarbonate, polyurethane, polyimide, polyester, polyether sulfone, polyether ketone, polythioether, cycloolefin polymer and cycloolefin copolymer can be employed. A vinyl polymer, a polyacrylate and an aromatic group-containing polycarbonate are preferable, and a vinyl polymer is more preferable.

Examples of the monomer that can be used in the vinyl polymer include monomers described in, for example, Polymer Handbook, 2nd ed., J. Brandrup, Wiley Interscience (1975) Chapter 2, pages 1-483. Specifically, compounds having one addition-polymerizable unsaturated bond selected from styrene derivatives, 1-vinylnapphthalene, 2-vinylnaphthalene, vinylcarbazole, acrylic acid esters, methacrylic acid esters, acrylamides, methacrylamides, allyl compounds, vinyl ethers, vinyl esters, dialkyl itaconates, dialkyl esters or monoalkyl esters of fumaric acid, and the like can be exemplified.

Examples of the styrene derivatives include styrene, 2,4,6-tribromostyrene and 2-phenylstyrene.

Examples of the acrylic acid esters include methyl acrylate, ethyl acrylate, propyl acrylate, n-butyl acrylate, tert-butyl acrylate, chloroethyl acrylate, 2-hydroxyethyl acrylate, trimethylolpropane monoacrylate, benzyl acrylate, benzyl methacrylate, methoxybenzyl acrylate, furfuryl acrylate, tetrahydrofurfuryl acrylate and 2-phenyphenyl acrylate.

Examples of the methacrylic acid esters include methyl methacrylate, ethyl methacrylate, propyl methacrylate, butyl methacrylate, t-butyl methacrylate, chloroethyl methacrylate, 2-hydroxyethyl methacrylate, trimethylolpropane monomethacrylate, benzyl methacrylate, methoxybenzyl methacrylate, furfuryl methacrylate, tetrahydrofurfuryl methacrylate, and 2-phenylphenyl methacrylate.

Examples of the acrylamides include acrylamide, N-alkyl acrylamide (as the alkyl group, an alkyl group having from 1 to 3 carbon atoms, such as a methyl group, an ethyl group and a propyl group), N,N-dialkyl acrylamide (as the alkyl group, an alkyl group having from 1 to 6 carbon atoms), N-hydroxyethyl-N-methyl acrylamide and N-2-acetamideethyl-N-acetyl acrylamide.

Examples of the methacrylamides include methacrylamide, N-alkyl methacrylamide (as the alkyl group, an alkyl group having from 1 to 3 carbon atoms, such as a methyl group, an ethyl group and a propyl group), N,N-dialkyl methacrylamide (as the alkyl group, an alkyl group having from 1 to 6 carbon atoms), N-hydroxyethyl-N-methyl methacrylamide and N-2-acetamideethyl-N-acetyl methacrylamide.

Examples of the allyl compounds include allyl esters (for example, allyl acetate, allyl caproate, allyl caprate, allyl laurate, allyl palmitate, allyl stearate, allyl benzoate, allyl acetoacetate and allyl lactate), and allyl oxyethanol.

Examples of the vinyl ethers include alkyl vinyl ethers (as the alkyl, an alkyl having from 1 to 10 carbon atoms), such as hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether and tetrahydrofurfuryl vinyl ether).

Examples of the vinyl esters include vinyl butyrate, vinyl isobutyrate, vinyl trimethyl acetate, vinyl diethyl acetate, vinyl pivalate, vinyl caproate, vinyl chloroacetate, vinyl dichloroacetate, vinyl methoxyacetate, vinyl butoxyacetate, vinyl lactoate, vinyl-β-phenyl butylate and vinyl cyclohexyl carboxylate.

Examples of the dialkyl itaconates include dimethyl itaconate, diethyl itaconate and dibutyl itaconate. Examples of dialkyl esters or monoalkyl esters of the fumaric acid include dibutyl fumarate.

Other examples include acrylonitrile, methacrylonitrile, maleironitrile, and maleimide (such as N-methyl maleimide and N-phenyl maleimide).

Examples of the monomer that can be used in the polyacrylate and the aromatic group-containing polycarbonate include bisphenol derivatives (for example, bisphenol A, fluorene bisphenol and 9,9-bis[4-(2-hydroxyethoxy)phenyl]-fluorene, phthalic acid derivatives (for example, terephthalic acid and isophthalic acid), naphthalenedicarboxylic acid derivatives (for example, 2,6-nepthalenedicarboxylic acid), phosgene derivatives (for example, phosgene and phosgene dimer) and carbonic acid ester derivatives (for example, diphenyl carbonate).

The thermoplastic resin used in the invention has a refractive index of preferably larger than 1.50, more preferably larger than 1.55, further preferably larger than 1.60, and particularly preferably larger than 1.65. The refractive index in the invention is a value measured with an Abbe's refractometer (a product of Atago, DR-M4) for light having a wavelength of 589 nm.

The thermoplastic resin used in the invention has a glass transition temperature of preferably form 50 to 400° C., and more preferably from 80 to 380° C. When a resin having a glass transition temperature of 50° C. or higher, there is the tendency that an optical component having sufficient heat resistance is liable to obtain, and when a resin having a glass transition temperature of 400° C. or lower, there is the tendency to facilitate processing.

Further, the thermoplastic resin used in the invention has a light transmittance of preferably 80% or more, and more preferably 85% or more, at a wavelength of 589 nm in terms of the resin having a thickness of 1 mm.

The thermoplastic resin used in the invention has a number average molecular weight of from 1,000 to 500,000. The number average molecular weight of the thermoplastic resin is preferably from 3,000 to 300,000, more preferably from 5,000 to 200,000, and particularly preferably from 10,000 to 100,000. Where the number average molecular weight of the thermoplastic resin is less than 1,000, an organic-inorganic hybrid composition having sufficient mechanical strength cannot be obtained. On the other hand, where the number average molecular weight of the thermoplastic resin exceeds 500,000, it is difficult to conduct processing.

The thermoplastic resin used in the invention has a functional group capable of forming a chemical bond with the inorganic fine particles at one or more polymer chain terminals. The "chemical bond" used herein includes a covalent bond, an ionic bond, a coordinate bond and a hydrogen bond. Where plural functional groups are present, those may form different chemical bonds with the inorganic fine particles, respectively. Whether a chemical bond can be formed is determined by whether the functional group of the thermoplastic resin can form a chemical bond with the inorganic fine particles when the thermoplastic resin and the inorganic fine particles are mixed in an organic solvent as described in the Examples described hereinafter. In the organic-inorganic hybrid composition of the invention, the functional groups of the thermoplastic resin all may form a chemical bond with the inorganic fine particles, and part thereof may form a chemical bond with the inorganic fine particles.

The functional group capable of forming a chemical bond with the inorganic fine particles is not particularly limited in its structure so far as it can form a chemical bond with the inorganic fine particles. However, a functional group selected from the group consisting of

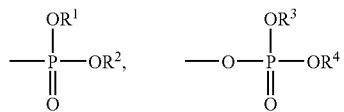

—$SO_3H$, —$OSO_3H$, —$CO_2H$ and —$Si(OR^5)_m R^6_{3-m}$, or its salt is preferable. Of those, a functional group selected from the group consisting of

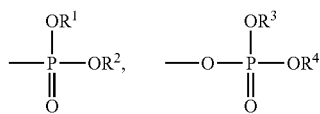

—$SO_3H$, —$CO_2H$ and —$Si(OR^5)_m R^6_{3-m}$, or its salt is preferable;

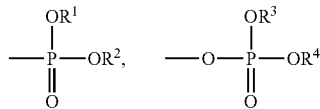

—$SO_3H$, —$CO_2H$, or those salts are more preferable; and

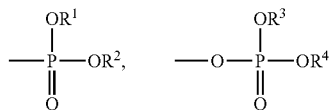

—$SO_3H$, or those salts are further preferable.

In the above formulae, $R^1$, $R^2$, $R^3$, $R^4$, $R^5$ and $R^6$ each independently represent a hydrogen atom, a substituted or unsubstituted alkyl group, a substituted or unsubstituted alkenyl group, a substituted or unsubstituted alkynyl group or a substituted or unsubstituted phenyl group, and are preferably a hydrogen atom or a substituted or unsubstituted alkyl group. m is an integer of from 1 to 3, and is preferably 3.

The functional group capable of forming a chemical bond with the inorganic fine particles may be present at only one terminal or both terminals of a polymer chain of the thermoplastic resin. However, the functional group preferably is present at only one terminal of a polymer chain. Further, plural functional groups may be present at the terminal. The "terminal" used herein means a moiety excluding a structure sandwiched between the repeating unit and the repeating unit, constituting the polymer chain.

A method of introducing the functional group into the polymer chain terminal is not particularly limited. For example, the functional group may be introduced at the time of polymerization, or after polymerization, the terminal functional group of the polymer once isolated may be converted, or the main chain thereof may be decomposed, as described in Experimental New Polymer Physics 4, Synthesis and Reaction of Polymer (3) Reaction and Decomposition of Polymer (The Society of Polymer Science, Japan), Chapter 3 "Terminal Reactive Polymer". Polymer reactions such as a method of obtaining a polymer by polymerizing using an initiator having a functional group and/or a protected functional group, a terminator, a chain transfer agent or the like, and a method of modifying a phenol terminal of a polycarbonate obtained from bisphenol A with a reacting agent containing a functional group, can further be used. For example, a radical polymerization of vinyl monomer by a chain transfer method using a sulfur-containing chain transfer agent, described in Experimental New Polymer Physics 2, Reaction and Synthesis of Polymer (1) Synthesis of Addition-Type Polymer (The Society of Polymer Science, Japan), pages 110-112; a living cationic polymerization using a functional group-containing initiator and/or a functional group-containing terminator, described in Experimental New Polymer Physics 2, Reaction and Synthesis of Polymer (1) Synthesis of Addition-Type Polymer (The Society of Polymer Science, Japan), pages 255-256; and a ring-opening metathesis polymerization using a sulfur-containing chain transfer agent, described in Macromolecules, vol. 36, pages 7020-7026 (2003) can be exemplified.

Preferable specific examples of the thermoplastic resin that can be used in the invention are described below (illustrative compounds P-1 to P-14), but the thermoplastic resin that can be used in the invention is not limited to those. The structure in parenthesis shows a repeating unit, and x and y of the repeating unit shows a copolymerization ratio (molar ratio).

P-1
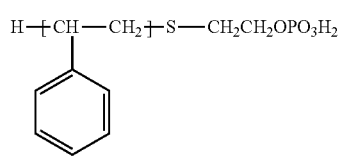

P-2
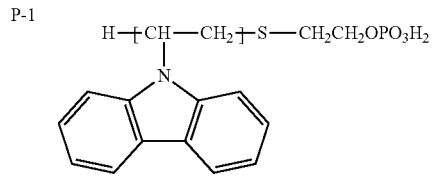

P-3
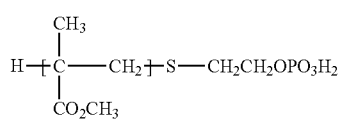

P-4
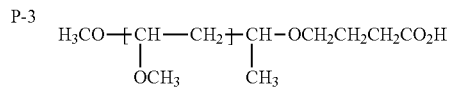

P-5
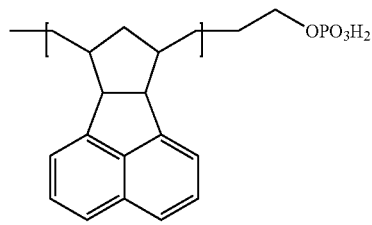

P-6
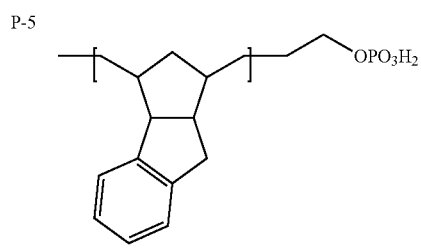

P-7
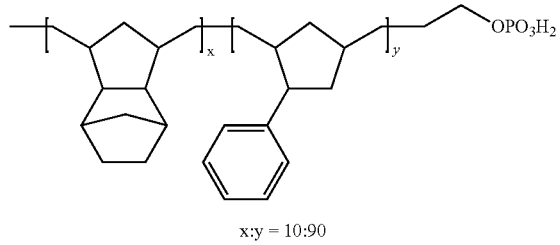

x:y = 10:90

P-8
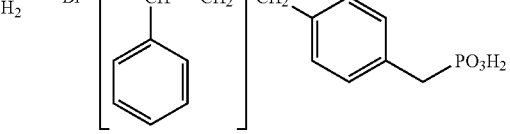

P-9
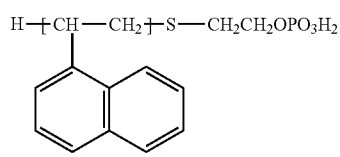

P-10
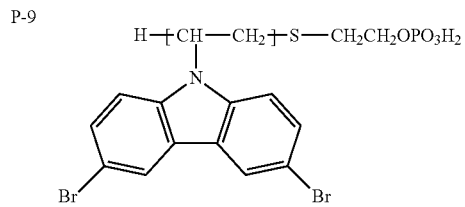

P-11
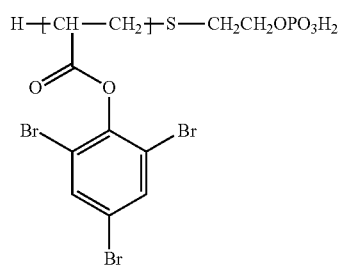

P-12
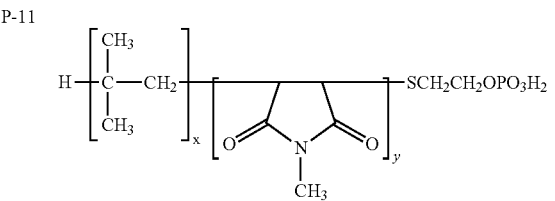

x:y = 50:50

-continued
P-13
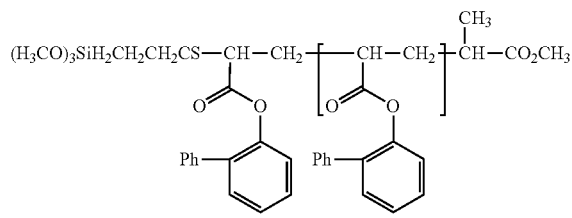
P-14
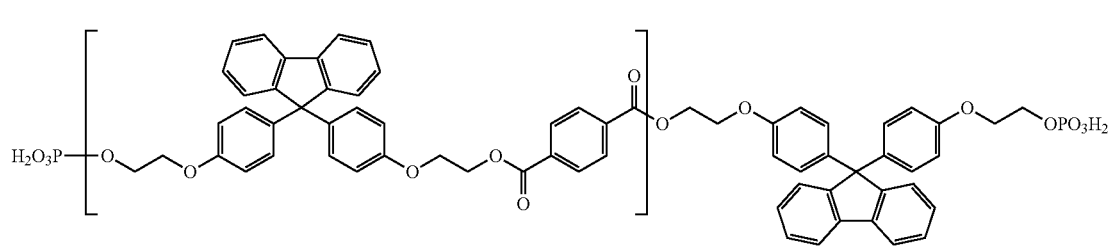
P-15
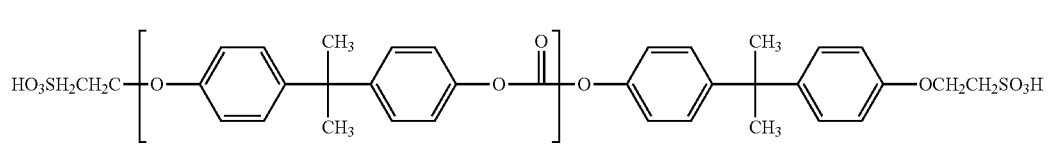
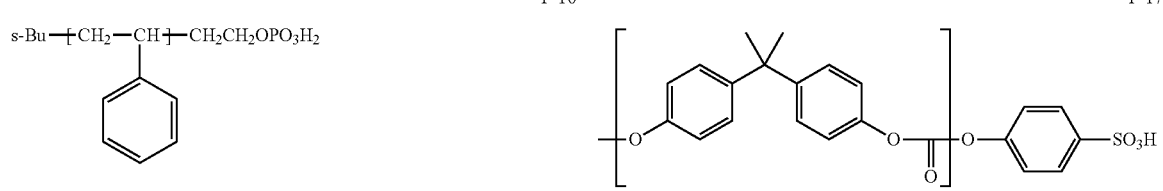
P-16  P-17
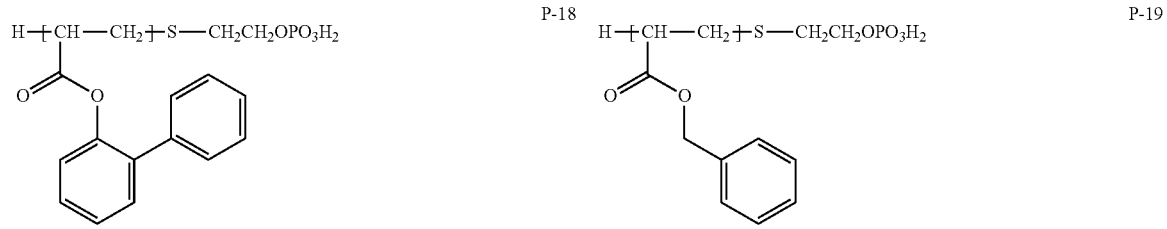
P-18  P-19
P-20
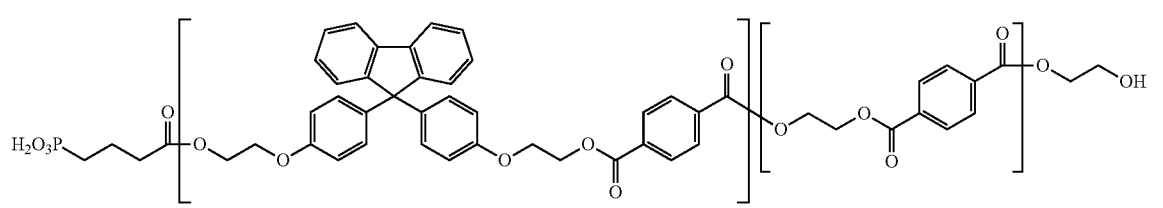
P-21

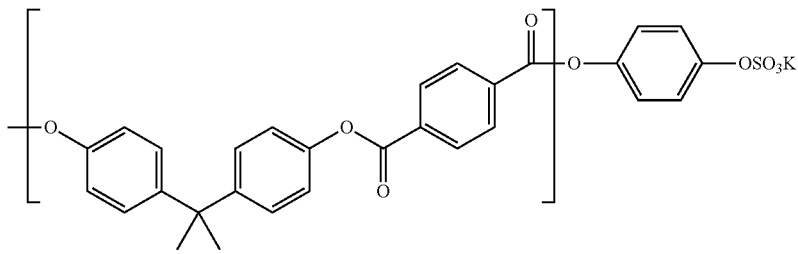

P-22

Those thermoplastic resins may be used alone or as mixtures of two or more thereof. Further, thermoplastic resin may contain other copolymerization components.

The organic-inorganic hybrid composition of the invention may contain resins that do not satisfy the requirements of the invention, in addition to the thermoplastic resin satisfying the requirements of the invention. For example, a resin that does not have a functional group at the polymer chain terminal and a thermoplastic resin satisfying the requirements of the invention may be mixed and used. The kind of a resin that does not have a functional group at the polymer chain terminal is not particularly limited, but resins satisfying the optical properties, thermal properties and molecular weight as described before are preferable.

[Inorganic Fine Particles]

The organic-inorganic hybrid composition of the invention contains inorganic fine particles having a refractive index of from 1.90 to 3.00.

The inorganic fine particles used in the invention include oxide fine particles, sulfide fine particles, selenide fine particles and telluride fine particles. Specific examples of the inorganic fine particles include titanium oxide fine particles, zinc oxide fine particles, zirconium oxide fine particles, tin oxide fine particles, zinc sulfide fine particles and barium titanate fine particles. Of those, titanium oxide fine particles, zirconium oxide fine particles, zinc sulfide fine particles and barium titanate are preferable, and fine particles containing titanium oxide and/or zirconium oxide are more preferable. However, the inorganic fine particles that can be used in the invention are not limited to the above illustrative materials.

In the invention, one kind of the inorganic fine particles may be used alone, or plural kinds of the inorganic fine particles may be combined and used. Further, the inorganic fine particles may be used as a composite of those inorganic materials from the standpoints of refractive index, transparency and stability. Additionally, for various purposes of reduction in photocatalyst activity, reduction in water absorption properties and the like, those fine particles may be fine particles that are doped with a different kind of an element, a surface layer of which is coated with a different kind of a metal oxide such as silica and alumina, or a surface of which is modified with a silane coupling agent, a titanate coupling agent or the like.

A method for producing the inorganic fine particles used in the invention is not particularly limited, and any conventional methods can be used. For example, the desired oxide fine particles can be obtained by using a metal halide or a metal alkoxide as a raw material, and hydrolyzing in a reaction system containing water.

Specifically, titanyl sulfate is exemplified as a raw material for the synthesis of titanium oxide nanoparticles, and a zinc salt such as zinc acetate and zinc nitrate is exemplified as a raw material for the synthesis of zinc oxide nanoparticles. Metal alkoxides such as tetraethoxysilane and titanium tetraisopropoxide are suitable as a raw material of the inorganic fine particles. A synthesis method of such inorganic fine particles includes a method described in, for example, Japanese Journal of Applied Physics, vol. 37, pages 4603-4608 (1998), or Langmuir, vol. 16, 1, pages 241-246 (2000) can be exemplified.

In particular, where oxide nanoparticles are synthesized from a sol formation method, it is possible to use a procedure of passing through a precursor such as a hydroxide, and then dehydrocondensing or deflocculating the same with an acid or an alkali, thereby forming a hydrogel, as in the synthesis of titanium oxide nanoparticles using titanyl sulfate as a raw material. In such a procedure of passing through a precursor, the precursor is isolated and purified with an optional method such as filtration and centrifugal separation, and this is preferable in the point of purity of a final product. An appropriate surfactant such as sodium dodecylbenzene sulfonate (abbreviated DBS) or dialkylsulfosuccinate monosodium salt (a product of Sanyo Chemical Industries, Ltd., trade name "ELEMINOL JS-2") may be added to the hydrogel obtained, thereby insolubilizing sol particles in water and isolating the same. For example, the method described in Color Material, vol. 57, 6, pages 305-308 (1984) can be used.

Further, a method of preparing inorganic fine particles in an organic solvent can be exemplified as a method other than the method of hydrolyzing in water. In this case, the thermoplastic resin used in the invention may be dissolved in an organic solvent.

Examples of the solvent used in those methods include acetone, 2-butanone, dichloromethane, chloroform, toluene, ethyl acetate, cyclohexanone and anisole. Those may be in one kind alone or as mixtures of two or more kinds thereof.

Where the number average particle size of the inorganic fine particles used in the invention is too small, there is the possibility that properties inherent in materials constituting the fine particles vary, and on the other hand, where it is too large, there is the possibility that influence of Rayleigh scattering is remarkable, and transparency of the organic-inorganic hybrid composition extremely deteriorates. Therefore, the lower limit of the number average particle size of the inorganic fine particles used in the invention is preferably 1 nm or more, more preferably 2 nm or more, and further preferably 3 nm or more, and the upper limit thereof is preferably 15 nm or less, more preferably 10 nm or less, and further preferably 5 nm or less. Specifically, the number average particle size of the inorganic fine particles used in the invention is preferably from 1 to 15 nm, more preferably 2 to 10 nm and further preferably from 3 to 5 nm.

The "number average particle size" used herein can be measured with, for example, X ray diffraction (XRD) or transmission electron microscope (TEM).

The inorganic fine particles used in the invention have a refractive index in a range of from 1.90 to 3.00, preferably from 1.90 to 2.70, and more preferably from 2.00 to 2.70, at 22° C. in a wavelength of 589 nm. When the inorganic fine particles in the invention have a refractive index of 1.90 or more, it is easy to produce an organic-inorganic hybrid composition having a refractive index larger than 1.80. On the other hand, when the refractive index is 3.00 or less, it is easy to produce an organic-inorganic hybrid composition having a light transmittance of 80% or more.

The refractive index of the inorganic fine particles can be estimated by, for example, a method of measuring a refractive index of a composite as a transparent film, obtained by compositing the inorganic fine particles with the thermoplastic resin used in the invention with Abbe's refractometer (for example, DM-M4, a product of Atago) and converting the value from a refractive index of a resin component alone separately measured, or a method of measuring refractive indexes of dispersions of the fine particles, having different concentration, thereby calculating the refractive index of the fine particles.

The content of the inorganic fine particles in the organic-inorganic hybrid composition of the invention is preferably from 20 to 95% by mass, more preferably from 25 to 70% by mass, and particularly preferably from 30 to 60% by mass, from the standpoints of transparency and high refractive index. Further, the mass ratio of the inorganic fine particles to the thermoplastic resin (dispersed polymer) in the invention is preferably from 1:0.01 to 1:100, more preferably from 1:0.05 to 1:10, and particularly preferably from 1:0.05 to 1:5, from the point of dispersibility.

[Additives]

Other than the above-described thermoplastic resin and the inorganic fine particles, various additives may appropriately be blended with the organic-inorganic hybrid composition of the invention from the standpoints of uniform dispersibility, flowability when molding, release properties, weather resistance and the like.

The blending proportion of those additives varies depending on the purpose, but is preferably from 0 to 50% by mass, more preferably from 0 to 30% by mass, and particularly preferably from 0 to 20% by mass, based on the sum of the inorganic fine particles and the thermoplastic resin.

[Surface Treating Agent]

In the invention, in mixing the organic fine particles dispersed in water or an alcohol solvent with the thermoplastic resin as described hereinafter, a surface modifier of the fine particles, other than the above-described thermoplastic resin may be added according to various purposes such as the purpose of increasing extructability and replacement to an organic solvent, the purpose of increasing uniform dispersibility into the thermoplastic resin, the purpose of decreasing water absorption properties of the fine particles or the purpose of increasing weather resistance. The surface treating agent has a weight average molecular weight of preferably from 50 to 50,000, more preferably from 100 to 20,000, and further preferably from 200 to 10,000.

The surface treating agent preferably has the structure represented by the following formula (1).

$$A\text{-}B \qquad \text{Formula (1)}$$

wherein A represents a functional group capable of forming a chemical bond with the surface of the inorganic fine particles used in the invention, and B represents a monovalent group or polymer of from 1 to 30 carbon atoms having a compatibility or reactivity with a resin matrix comprising the thermoplastic resin used in the invention as a main component. The "chemical bond" used herein means a covalent bond, an ionic bond, a coordinate bond, a hydrogen bond or the like.

Preferable examples of the group represented by A are the same as exemplified as the functional groups of the thermoplastic resin used in the invention.

On the other hand, the chemical structure of the group represented by B is preferably the same as or similar to the chemical structure of the thermoplastic resin that is the main component of the resin matrix, from the standpoint of compatibility. In the invention, the chemical structure of B as well as the thermoplastic resin preferably has an aromatic ring particularly from the standpoint of achieving high refractive index.

Examples of the surface treating agent preferably used in the invention include p-octylbenzoic acid, p-propylbenzoic acid, acetic acid, propionic acid, cyclopentanecarboxylic acid, dibenzyl phosphate, monobenzyl phosphate, diphenyl phosphate, di-α-naphthyl phosphate, phenylphosphoric acid, phenylphosphoric acid monophenyl ester, KAYAMER PM-21 (trade name; a product of Nippon Kayaku Co., Ltd.), KAYAMER PM-2 (trade name, a product of Nippon Kayaku Co., Ltd.), benzenesulfonic acid, naphthalenesulfonic acid, paraoctylbenzenesulfonic acid, and silane coupling agents described in, for example, JP-A-5-221640, JP-A-9-100111 and JP-A-2002-187921. However, the surface treating agent is not limited to those.

Those surface treating agents may be used alone or as mixtures of tow or more thereof.

Those surface treating agents are added in a total amount of preferably from 0.01 to 2 times, more preferably from 0.03 to 1 time, and particularly preferably from 0.05 to 0.5 time, in terms of mass, the mass of the fine particles.

[Plasticizer]

Where the thermoplastic resin used in the invention has high glass transition temperature, molding of a composition may not always be easy. Therefore, a plasticizer may be used to decrease the molding temperature of the composition of the invention. The addition amount where the plasticizer is added is preferably from 1 to 50% by mass, more preferably from 2 to 30% by mass, and particularly preferably from 3 to 20% by mass, based on the mass of the sum of the organic-inorganic hybrid composition.

The plasticizer used in the invention is required to determine totally considering compatibility with a resin, weather resistance, plasticizing effect and the like. The optimum material cannot be completely determined because of depending on other composition. However, from the standpoint of refractive index, a material having an aromatic ring is preferable, and a material having a structure represented by the following formula (2) can be exemplified as the representative example.

Formula (2)

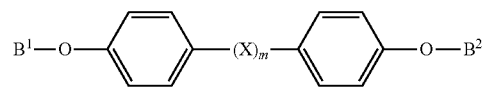

wherein $B^1$ and $B^2$ represent an alkyl group having from 6 to 18 carbon atoms or an allylalkyl group having from 6 to 18 carbon atoms, m is 0 or 1, X is one of

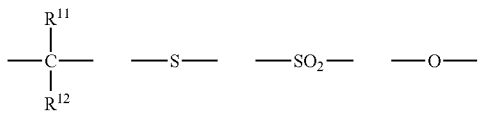

and $R^{11}$ and $R^{12}$ each independently represent a hydrogen atom or an alkyl group having 4 or less carbon atoms.

In the compound represented by the formula (2), $B^1$ and $B^2$ can select an optional alkyl group or allylalkyl group in a carbon atom range of from 6 to 18. Where the number of carbon atoms is less than 6, there is the case that the molecular weight is too low, so that such a compound boils at the melting temperature of a polymer, resulting in generation of bubbles. On the other hand, where the number of carbon atoms exceeds 18, there is the case that compatibility with a polymer deteriorates, resulting in insufficient addition effect.

Examples of $B^1$ and $B^2$ specifically include linear alkyl groups such as n-hexyl group, n-octyl group, n-decyl group, n-dodecyl group, n-tetradecyl group, n-hexadecyl group and n-octadecyl group; branched alkyl groups such as 2-hexyldecyl group and methyl-branched octadecyl group; and allylalkyl groups such as benzyl group and 2-phenylethyl group. Specific examples of the compound represented by the above formula (2) include the following compounds, and above all, W-1 (trade name: KP-L155, a product of Kao Corporation) is preferable.

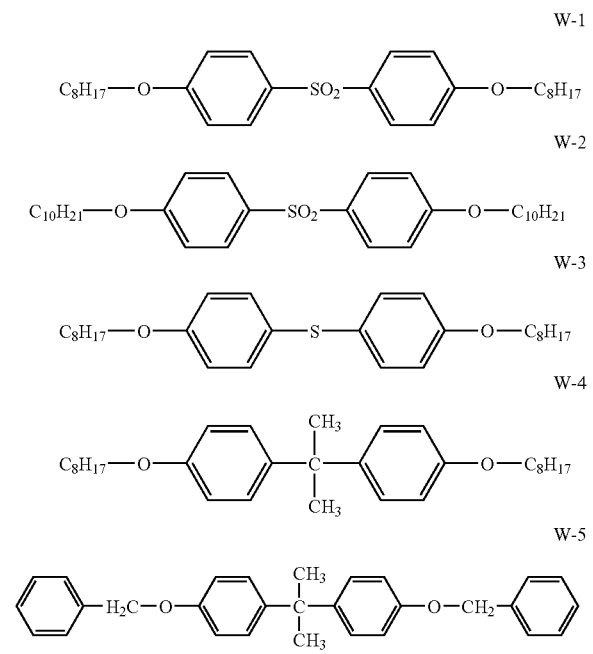

[Other Additives]

Other than the above components, the conventional release agents such as a modified silicone oil may be added for the purpose of improving moldability, and the conventional deterioration preventives such as hindered phenol type, amine type, phosphor type and thioether type may appropriately be added for the purpose of improving light resistance and thermal deterioration. Where those are added, the amount thereof is preferably from about 0.1 to 5% by mass based on the mass of the total solid content of the organic-inorganic hybrid composition.

[Production Method of Organic-Inorganic Hybrid Composition]

The inorganic fine particles used in the invention are dispersed in the resin in the form of chemical bonding with the thermoplastic resin having the above-described functional group at one or more polymer chain terminals.

The inorganic fine particles used in the invention have small particle size and high surface energy. Therefore, where those are isolated as a solid, it is difficult to redisperse the same. Therefore, the inorganic fine particles are preferably mixed with the thermoplastic resin in the state of being dispersed in a solution to form a stable dispersant. Preferable production method of the composite includes (1) a method of producing a composite of inorganic fine particles and a thermoplastic resin, comprising subjecting the inorganic fine particles to a surface treatment in the presence of the above-described surface treating agent, extracting the surface-treated inorganic fine particles in an organic solvent, and uniformly mixing the extracted inorganic fine particles and the thermoplastic resin, and (2) a method of producing a composite of inorganic fine particles and a thermoplastic resin, comprising uniformly mixing the inorganic fine particles and the thermoplastic resin using a solvent that can uniformly disperse or dissolve those.

When the composite of inorganic fine particles and the thermoplastic resin is produced by the method (1) above, a water-insoluble solvent such as toluene, ethyl acetate, methyl isobutyl ketone, chloroform, dichloroethane, dichloromethane, chlorobenzene and methoxybenzene is used as an organic solvent. The surface treating agent used in extraction of the inorganic fine particles in an organic solvent and the thermoplastic resin may be the same kind or different kind. The surface treating agent preferably used includes the materials described in the item of the surface treating agent above.

In mixing the inorganic fine particles extracted in an organic solvent and the thermoplastic resin, additives such as plasticizers, release agents or different kind of polymers may be added, if required and necessary.

When the method (2) above is employed, a hydrophilic polar solvent such as dimethyl acetamide, dimethyl formamide, dimethyl sulfoxide, benzyl alcohol, cyclohexanol, ethylene glycol monomethyl ether, 1-methoxy-2-propanol, tert-butanol, acetic acid and propionic acid, alone or in a form of a mixed solvent thereof, or a mixed solvent of a water-insoluble solvent such as chloroform, dichloroethane, dichloromethane, ethyl acetate, methyl ethyl ketone, methyl isobutyl ketone, toluene, chlorobenzene and methoxybenzene, and the above-described polar solvent is preferably used. In this case, separately from the above-described thermoplastic resin, a dispersant, a plasticizer, a release agent or a different kind of a polymer may be added, if required and necessary. When the inorganic fine particles dispersed in water/methanol, it is preferable that a hydrophilic solvent having a boiling point higher than that of water/alcohol and dissolving the thermoplastic resin is added, and water/methanol are then concentrated and distilled away, thereby substituting the dispersion of the inorganic file particles with a polar organic solvent, followed by mixing with a resin. In this case, the surface treating agent described above may be added.

A solution of the organic-inorganic hybrid composition obtained by the methods (1) and (2) above can be cast molded to form a molding. However, it is particularly preferable in the invention that the solution is subjected to concentration, freeze drying, reprecipitation from an appropriate poor solvent, or the like to remove a solvent, and the powdered solid content is molded by a method such as injection molding or compression molding.

[Molding]

The molding of the invention can be produced by molding the organic-inorganic hybrid composition. It is useful for the molding of the invention to show the refractive index and optical properties described in the description of the organic-inorganic hybrid composition. Above all, a molding having a light transmittance of 70% or more at a wavelength of 589 nm in terms of the molding having a thickness of 1 mm, and a refractive index of 1.63 or more is useful.

The molding of the invention preferably has the maximum thickness of 0.1 mm or more. The maximum thickness is preferably from 0.1 to 5 mm, and more preferably from 1 to 3 mm. The molding having such a thickness is particularly useful as an optical component having a high refractive index. Such a thick molding is generally difficult to produce by a solution casting method because a solvent is difficult to escape. However, when the organic-inorganic hybrid composition of the invention is used, molding is easy and complicated shape such as aspheric surface can easily be realized. Thus, according to the invention, a molding having good transparency can be obtained while utilizing high refractive index properties of fine particles.

[Optical Component]

The molding of the invention has high refraction properties, light transmission property and lightweight properties in combination, and is a molding having excellent optical properties. The optical component of the invention comprises such a molding. The kind of the optical component of the invention is not particularly limited. It particular, it can suitably be utilized as optical components utilizing excellent optical properties of the organic-inorganic hybrid composition of the invention, particularly optical components that transmit light (so-called passive optical components). Examples of an optically functional device provided with such an optical component include various display devices (liquid crystal display, plasma display and the like), various projector devices (OHP, liquid crystal projector and the like), optical fiber communication devices (optical waveguide, optical amplifier and the like), and photographic devices such as cameras and video.

Examples of the passive optical component used in an optically functional device include lenses, prisms, prism sheets, panels (plate-like molding), films, optical waveguides (film-like, fiber-like, etc.), optical discs, and encapsulants of LED. If required and necessary, such a passive optical component may be provided with an optional coating layer such as a protective layer that prevents mechanical damages by friction or abrasion, a light absorption layer that absorbs light having undesired wavelength causing deterioration of fine particles or a substrate, a transmission-blocking layer that suppresses or prevents transmission of reactive low molecules such as moisture or oxygen gas, an antiglare layer, an antireflective layer and a low refractive index layer; or an optional additional function layer, thereby forming a multi-layered structure. Examples of such an optional coating layer include a transparent conductive layer or a gas barrier layer, comprising an inorganic oxide coating layer; and a gas barrier layer or a hard coat layer, comprising an organic material coating layer. The coating method can use the conventional coating methods such as a vacuum deposition method, a CVD method, a sputtering method, a dip coat method and a spin coat method.

The optical component using the organic-inorganic hybrid composition of the invention is particularly suitable to a lens substrate. The lens substrate produced using the organic-inorganic hybrid composition of the invention has high refraction properties, light transmission properties and light-weight properties in combination, and thus is excellent in optical properties. Further, it is possible to optionally adjust a refractive index of a lens substrate by appropriately adjusting the kind of monomers constituting the organic-inorganic hybrid composition and the amount of the inorganic fine particles dispersed.

The "lens substrate" used herein means a simple member that can exhibit lens function. A film or a member can be provided on the surface of or around the lens substrate according to use environment or the purpose of use of the lens. For example, a protective layer, an antireflective film, a hard coat layer or the like can be formed on the surface of the lens substrate. Further, the circumference of the lens substrate can be fitted in a substrate-holding frame or the like to fix. However, those films and frames are a member to be added to the lens substrate intended in the invention, and are distinguished from the lens substrate itself intended in the invention.

When the lens substrate of the invention is utilized as a lens, the lens substrate itself of the invention may be used as a lens, or a film or a frame is added to the lens substrate, and the assembly may be used as a lens. Kind and shape of a lens using the lens substrate of the invention is not particularly limited. The lens substrate of the invention is used in, for example, eyeglasses, lenses for optical instruments, lenses for optoelectronics, lenses for lasers, lenses for pickups, lenses for in-vehicle cameras, lenses for portable cameras, lenses for digital cameras, and lenses for OHP and microlens arrays.

EXAMPLES

The characteristics of the invention are described more specifically by referring to the following Examples. In the following Examples, the material used, its amount and ratio, the details of the treatment and the treatment process may be suitably modified or changed not overstepping the spirit and the scope of the invention. Accordingly, the invention should not be limited to the Examples mentioned below.

[Method for Analysis and Evaluation]

(1) Observation with Transmission Electron Microscope (TEM):

Using a transmission electron microscope H-9000 UHR Model, a product of Hitachi, Ltd. (accelerating voltage: 200 kV, degree of vacuum in observation: about $7.6 \times 10^{-9}$ Pa), a sample was observed.

(2) Measurement of Light Transmittance:

A sample to be measured is molded to prepare a substrate having a thickness of 1.0 mm, and the substrate was measured with light having a wavelength of 589 nm using a UV-visible ray spectrometric device, UV-3100 (a product of Shimadzu Corporation).

(3) Measurement of Refractive Index:

Using an Abbe's refractometer (DR-M4, a product of Atago), a sample was measured with light having a wavelength of 589 nm.

(4) X-Ray Diffraction (XRD) Spectrum Measurement:

Using RINT 1500, a product of Rigaku Corporation (X-ray source: copper K$\alpha$ ray, wavelength: 1.5418 angstroms), a sample was measured at 23° C.

(5) Measurement of Molecular Weight

Number average molecular weight and weight average molecular weight is each a molecular weight in terms of polystyrene conversion by detection with a differential refractometer (solvent: tetrahydrofuran) using GPC analyzer using columns of TSK gel GMHxL, TSK gel G4000HxL and TSK gel G2000HxL, trade names, products of Tosoh Corporation.

[Synthesis of Organic-Inorganic Hybrid Composition]

(1) Synthesis of Titanium Oxide Fine Particles

Titanium oxide fine particles were synthesized according to the method described in Synthesis Example 9 of JP-A-2003-73559. Formation of anatase titanium oxide fine particles (number average particle size of about 5 nm) was confirmed with XRD and TEM.

(2) Synthesis of Zirconium Oxide Fine Particles

A zirconium oxychloride solution having a concentration of 50 g/liter was neutralized with a 48% sodium hydroxide aqueous solution to obtain a hydrated zirconium suspension. The suspension was filtered, and then washed with ion-exchanged water to obtain a hydrated zirconium cake. This cake was dissolved in ion-exchanged water as a solvent to prepare a solution having a concentration of 15% by mass in terms of zirconium oxide. This was placed in an autoclave, and subjected to hydrothermal treatment at 150° C. under a pressure of 150 atm for 24 hours to obtain a suspension of zirconium oxide fine particles. TEM confirmed the formation of zirconium oxide fine particles having a number average particle size of 5 nm.

(3) Synthesis of Toluene Dispersion (1) of Zirconium Oxide Fine Particles

The suspension of zirconium oxide fine particles synthesized in (2) above and a toluene solution of KAYAMER PM-21, a product of Nippon Kayaku Co., Ltd., dissolved therein were mixed, and then stirred at 50° C. for 8 hours. The toluene solution was extracted out to prepare a toluene dispersion of zirconium oxide fine particles.

(4) Preparation of Zirconium Oxide Dimethylacetamide Dispersion (2)

500 g of N,N'-dimethylacetamide was added to 500 g of the zirconium oxide dispersion (15% by mass aqueous dispersion) prepared in (2) above, and the resulting mixture was concentrated under reduced pressure to the amount of about 500 g or less, thereby conducting solvent substitution. N,N'-dimethylamide was added to adjust the concentration, and 15% by mass of zirconium oxide dimethylacetamide dispersion (2) was obtained.

(5) Synthesis of Illustrative Compound P-19

96.9 g (0.55 mol) of benzyl methacrylate, 0.9 g (5.5 mmol) of AIBN (azobisisobutyronitrile), 0.39 g (5 mmol) of 2-mercaptoethanol and 100 ml of THF are charged in a 300 ml three-necked flask equipped with a reflux condenser and a gas introduction cock, and were heated at 65° C. for 3 hours under nitrogen stream. A large amount of methanol was introduced into the flask to form a precipitate. The precipitate was filtered off, washed with a large amount of methanol, and vacuum dried at 60° C. for 3 hours to obtain a polymer (yield 80%).

1.0 g (6.5 mmol) of phosphorus oxychloride, 1.2 g (12 mmol) of triethylamine and 15 ml of THF were charged in a 100 ml three-necked flask equipped with a gas introduction cock. A solution of 10 g of the polymer obtained above dissolved in 25 ml of THF was added dropwise to the flask while maintaining the inner temperature at 0° C. or lower under nitrogen stream. After completion of the dropwise addition, the resulting mixture was stirred at room temperature for 8 hours. 10 ml of water was added to the flask, and the resulting mixture was stirred at room temperature for 2 hours. A large amount of methanol was added to the flask to form a precipitate. The precipitate was filtered off, washed with a large amount of methanol, and vacuum dried at 60° C. for 3 hours to obtain the illustrative compound P-19. Yield of the compound obtained was 95%, and the compound obtained had a number average molecular weight of 21,100 and a weight average molecular weight of 38,300.

(6) Synthesis of Living Radical Polymerization Initiator A 20 g (75.8 mmol) of α,α'-dibromo-p-xylene and 70 ml of m-xylene were charged in a 200 ml three-necked flask equipped with a reflux condenser and a gas introduction cock, and a solution of 16.8 g (80.7 mmol) of triisopropyl phosphate dissolved in 20 ml of m-xylene was added dropwise to the flask under nitrogen stream while refluxing under heating. After completion of the dropwise addition, the resulting mixture was refluxed under heating for 3 hours to distill away a solvent. The mixture was purified with silica gel chromatography to obtain a living radical polymerization initiator A (initiator A) of the following structure in a yield of 53%.

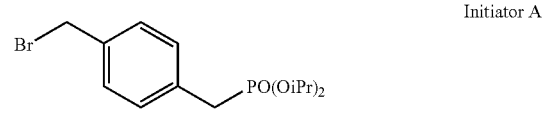

Initiator A (7) Synthesis of Illustrative Compound P-8

0.41 g (2.86 mmol) of copper bromide, 59.6 g (0.57 mol) of styrene, 0.5 g (2.86 mmol) of N,N,N',N',N"-pentamethyl diethylenetriamine and 1.0 g (2.86 mmol) of the initiator A were charged in a 200 ml three-necked flask equipped with a reflux condenser and a gas introduction cock, subjected to nitrogen substitution 5 times, and then heated at 80° C. for 5 hours under nitrogen stream. Temperature of the flask was returned to room temperature, and 30 g of alumina and 50 ml of toluene were added to the flask. The resulting mixture was stirred for 10 minutes, and sellite formed was filtered out. The filtrate was introduced into a large amount of methanol to form a precipitate. The precipitate was filtered off, washed with a large amount of methanol and vacuum dried at 60° C. for 3 hours to obtain a polymer (yield 38%).

10 g of the polymer obtained above, 2.3 g (15 mmol) of trimethylsilyl bromide and 40 ml of methylene chloride were charged in a 100 ml three-necked flask equipped with a gas introduction cock, and were stirred at room temperature for 24 hours under nitrogen stream. 10 ml of water was added to the flask, and the resulting mixture was stirred for 1 hour. The mixture was introduced into a large amount of methanol to form a precipitate. The precipitate formed was filtered off, washed with a large amount of methanol, and vacuum dried at 60° C. for 3 hours to obtain the illustrative compound P-8. Yield of the compound obtained was 96%, and the compound had a number average molecular weight of 25,200 and a weight average molecular weight of 28,200.

(8) Synthesis of Illustrative Compound P-16

1.15 ml (1.61 mmol) of 1.4 mol/liter sec-butyllithium cyclohexane solution was added to 300 ml of dehydrated benzene in a three-necked flask under nitrogen stream, and 50 g (0.48 mol) of styrene was added dropwise to the flask such that the reaction temperature maintains at 40° C. After the dropwise addition, the flask was cooled to 10° C., and 0.1 ml of ethylene oxide was added thereto. The flask was heated to 40° C., and the mixture in the flask was added to a benzene solution containing 0.5 ml of phosphorus oxychloride. After stirring the resulting mixture at 40° C. for 3 hours, 10 ml of water was added to the mixture, and the resulting mixture was introduced into a large amount of methanol to form a precipitate. The precipitate formed was filtered off, washed with a large amount of methanol and vacuum dried at 60° C. for 3 hours to obtain a polymer. Yield of the polymer was 90%, and the polymer had a number average molecular weight of 30,400 and a weight average molecular weight of 31,900.

(9) Synthesis of PMMA (Polymethyl Methacrylate)

5.00 g of methyl methacrylate and 0.25 g of azobisisobutyronitrile were added to 2-butanone, and polymerization was conducted at 70° C. under nitrogen to synthesize PMMA. Weight average molecular weight of PMMA obtained was 100,000.

[Preparation of Organic-Inorganic Hybrid Composition and Production of Molding]

(1) Examples 1 to 6 and Comparative Examples 1 to 5

Each of lens of Examples 1 to 6 and Comparative Examples 1 to 5 was produced by the following procedures. The kind of thermoplastic resins and the kind and use amount of inorganic fine particles, used in the following procedures are shown in Table 1 below, and refractive indexes of thermoplastic resins and inorganic fine particles are also shown in Table 1. In Table 1, the addition amount of the inorganic fine particles is indicated on the basis of the mass of the molding produced. In Comparative Examples 1 to 3, inorganic fine particles were not added, and only a thermoplastic resin was molded.

Titanium oxide fine particles or zirconium oxide fine particles, dispersed in toluene were added dropwise to an anisole solution of a thermoplastic resin over 5 minutes. The mixture obtained was stirred for 1 hour, and a solvent was distilled away by condensation. The organic-inorganic hybrid composition obtained was compression molded under heating (temperature: 180° C., pressure: 13.7 MPa, time: 2 minutes) to produce a molding for a lens having a thickness of 1 mm. The molding was cut and the cut cross section was observed with TEM to confirm as to whether the inorganic fine particles are uniformly dispersed in the thermoplastic resin. Further, light transmittance measurement and refractive index measurement were conducted. The results obtained are shown in Table 1 below. The molding for a lens was then molded into a lens shape to obtain a lens as an optical component.

(2) Example 7

The thermoplastic rein P-19, n-octylbenzoic acid and KP-L155 (trade name, a product of Kao Corporation) as a plasticizer were added to the zirconium oxide dimethylacetamide dispersion obtained above such that the mass ratio of $ZrO_2$ solid component/P-19/n-octylbenzoic acid/KP-L155 is 35.7/42.9/7.1/14.3. The resulting mixture was uniformly mixed by stirring, and the dimethylacetamide solvent was concentrated under heating and reduced pressure. The concentrated residue was compression molding under heating under the same conditions as in Example 1 to prepare a transparent molding (lens substrate). The molding thus obtained in Example 7 was cut, and the cut cross section was observed with TEM. Further, light transmittance measurement and refractive index measurement were conducted. The results obtained are shown in Table 1 below.

(3) Examples 8 and 9

Transparent moldings (lens substrates) of Examples 8 and 9 were prepared in the same manner as in Example 7 except for changing the thermoplastic resin P-19 in Example 7 to the thermoplastic resins P-8 and P-16, respectively. The transparent moldings thus obtained in Examples 8 and 9 were cut, and the respective cut cross section was observed with TEM. Further, light transmittance measurement and refractive index measurement were conducted. The results obtained are shown in Table 1 below.

(4) Example 10

The dimethylacetamide solution before concentration of the organic-inorganic hybrid composition in Example 8 was introduced into a large excess of water to form a precipitate. The precipitate formed was filtered off, and dried to obtain an organic-inorganic hybrid composition. The organic-inorganic hybrid composition obtained was treated in the same manner as in Example 1 to obtain a transparent molding (lens substrate) of Example 10. The transparent molding thus obtained in Example 10 was cut, and the cut cross section was observed with TEM. Further, light transmittance measurement and refractive index measurement were conducted. The results obtained are shown in Table 1 below.

TABLE 1

|  | Thermoplastic resin | | Inorganic fine particles | | | Evaluation of optical component | | |
|---|---|---|---|---|---|---|---|---|
|  | Kind | Refractive index | Kind | Refractive index | Addition amount (mass %) | Dispersibility of inorganic fine particles | Transmittance (%) | Refractive index |
| Example 1 | Illustrative compound P-19 | 1.57 | Titanium oxide | 2.5 | 48 | Uniformly dispersed in resin | 80 | 1.71 |
| Example 2 | Illustrative compound P-19 | 1.57 | Zirconium oxide | 2.1 | 56 | Uniformly dispersed in resin | 83 | 1.66 |
| Example 3 | Illustrative compound P-8 | 1.59 | Zirconium oxide | 2.5 | 48 | Uniformly dispersed in resin | 81 | 1.73 |
| Example 4 | Illustrative compound P-8 | 1.59 | Zirconium oxide | 2.1 | 56 | Uniformly dispersed in resin | 83 | 1.67 |
| Example 5 | Illustrative compound P-16 | 1.59 | Zirconium oxide | 2.5 | 48 | Uniformly dispersed in resin | 80 | 1.73 |
| Example 6 | Illustrative compound P-16 | 1.59 | Zirconium oxide | 2.1 | 56 | Uniformly dispersed in resin | 84 | 1.67 |

TABLE 1-continued

| | Thermoplastic resin | | Inorganic fine particles | | | Evaluation of optical component | | |
| --- | --- | --- | --- | --- | --- | --- | --- | --- |
| | Kind | Refractive index | Kind | Refractive index | Addition amount (mass %) | Dispersibility of inorganic fine particles | Transmittance (%) | Refractive index |
| Example 7 | Illustrative compound P-19 | 1.57 | Zirconium oxide | 2.1 | 35.7 | Uniformly dispersed in resin | 85 | 1.61 |
| Example 8 | Illustrative compound P-8 | 1.59 | Zirconium oxide | 2.1 | 35.7 | Uniformly dispersed in resin | 85 | 1.62 |
| Example 9 | Illustrative compound P-16 | 1.59 | Zirconium oxide | 2.1 | 35.7 | Uniformly dispersed in resin | 84 | 1.62 |
| Example 10 | Illustrative compound P-8 | 1.59 | Zirconium oxide | 2.1 | 35.7 | Uniformly dispersed in resin | 83 | 1.62 |
| Comparative Example 1 | Illustrative compound P-19 | 1.57 | — | — | 0 | — | 83 | 1.57 |
| Comparative Example 2 | Illustrative compound P-8 | 1.59 | — | — | 0 | — | 83 | 1.59 |
| Comparative Example 3 | Illustrative compound P-16 | 1.59 | — | — | 0 | — | 83 | 1.59 |
| Comparative Example 4 | Polystyrene | 1.59 | Zirconium oxide | 2.1 | 56 | Fine particle agglomeration (white turbid) | — | — |
| Comparative Example 5 | PMMA | 1.49 | Zirconium oxide | 2.5 | 46 | Fine particle agglomeration (white turbid) | — | — |

(Note)
Polystyrene is Product No. 18,242-7 (molecular weight 280,000), a product of Aldrich.

It is seen from Table 1 that the fine particle-containing transparent moldings of the invention have high refractive index, further show good transparency even in thick moldings having a thickness of 1 mm, and therefore can be suitably used to optical applications.

Further, it was confirmed that the organic-inorganic hybrid composition mainly comprising a thermoplastic resin, of the invention can precisely form a lens shape in conformity with a shape of a mold with good productivity.

INDUSTRIAL APPLICABILITY

The optical component of the invention contains an organic-inorganic hybrid composition having high refraction properties, light transmission properties and lightweight properties in combination. According to the invention, optical components having a refractive index optionally adjusted can relatively easily be provided. Further, it is easy to provide optical components having good mechanical strength and heat resistance. As a result, the invention is useful to provide optical components in a wide range, such as high refractive lenses, and therefore has high industrial applicability.

The invention claimed is:

1. An organic-inorganic hybrid composition comprising inorganic fine particles having a refractive index of from 1.90 to 3.00, and a thermoplastic resin having a functional group capable of forming a chemical bond with the inorganic fine particles only at one or more polymer chain terminals and having a number average molecular weight of from 1,000 to 500,000,
   wherein the functional group capable of forming a chemical bond with the inorganic fine particles is a functional group selected from the group consisting of

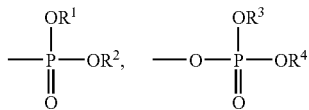

$-SO_3H$, $-OSO_3H$, and $-Si(OR^5)_m R^6_{3-m}$, wherein $R^1$, $R^2$, $R^3$, $R^4$, $R^5$ and $R^6$ each independently represents a hydrogen atom, a substituted or unsubstituted alkyl group, a substituted or unsubstituted alkenyl group, a substituted or unsubstituted alkynyl group or a substituted or unsubstituted phenyl group, and m is an integer of from 1 to 3,
or its salt.

2. The organic-inorganic hybrid composition according to claim 1, wherein the thermoplastic resin has a refractive index larger than 1.55.

3. The organic-inorganic hybrid composition according to claim 1, wherein the inorganic fine particles have a number average particle size of from 1 to 15 nm.

4. The organic-inorganic hybrid composition according to claim 1, wherein at least one of titanium oxide and zirconium oxide is contained as the inorganic fine particles.

5. The organic-inorganic hybrid composition according to claim 1, having a light transmittance of 80% or more at a wavelength of 589 nm in terms of the composition having a thickness of 1 mm.

6. The organic-inorganic hybrid composition according to claim 1, which is thermoplastic.

7. The organic-inorganic hybrid composition according to claim 1, which is a solvent-free solid.

8. A method for producing an organic-inorganic hybrid composition, comprising mixing inorganic fine particles having a refractive index of from 1.90 to 3.00, and a thermoplastic resin having a functional group capable of forming a chemical bond with the inorganic fine particles at one or more polymer chain terminals and having a number average molecular weight of from 1,000 to 500,000 in an organic solvent.

9. The method for producing an organic-inorganic hybrid composition according to claim 8, comprising surface-treating inorganic fine particles having a refractive index of from 1.90 to 3.00 in water, an alcohol or a mixture of water and an alcohol in the presence of a surface-treating agent; extracting the surface-treated inorganic fine particles in an organic solvent, and mixing the extracted inorganic fine particles with a thermoplastic resin having a functional group capable of forming a chemical bond with the extracted inorganic fine particles at one or more polymer chain terminals and having a number average molecular weight of from 1,000 to 500,000.

10. The method for producing an organic-inorganic hybrid composition according to claim 8, comprising mixing an organic solvent dispersion of inorganic fine particles having a refractive index of from 1.90 to 3.00 with a thermoplastic resin having a functional group capable of forming a chemical bond with the inorganic fine particles at one or more polymer chain terminals and having a number average molecular weight of from 1,000 to 500,000, and distilling away a solvent from the resulting mixed liquid.

11. The method for producing an organic-inorganic hybrid composition according to claim 8, comprising mixing an organic solvent dispersion of inorganic fine particles having a refractive index of from 1.90 to 3.00 with a thermoplastic resin having a functional group capable of forming a chemical bond with the inorganic fine particles at one or more polymer chain terminals and having a number average molecular weight of from 1,000 to 500,000, and reprecipitating the resulting mixed liquid.

12. An organic-inorganic hybrid composition produced by the production method according to claim 8.

13. A molding comprising the organic-inorganic hybrid composition according to claim 1, the molding having a maximum thickness of 0.1 mm or more.

14. The molding according to claim 13, having a light transmittance of 70% or more at a wavelength of 589 nm in terms of the molding having a thickness of 1 mm, and a refractive index of 1.63 or more.

15. An optical component comprising the molding according to claim 13.

16. The optical component according to claim 15, which is a lens substrate.

* * * * *